(12) United States Patent
Zeng (10) Patent No.: US 11,241,942 B2
(45) Date of Patent: Feb. 8, 2022

(54) VEHICLE HAVING A MOVABLE AND RETRACTABLE SUN SHIELD

(71) Applicant: Yaozong Zeng, Guangdong (CN)

(72) Inventor: Yaozong Zeng, Guangdong (CN)

( * ) Notice: Subject to any disclaimer, the term of this patent is extended or adjusted under 35 U.S.C. 154(b) by 376 days.

(21) Appl. No.: 16/333,604

(22) PCT Filed: Mar. 27, 2018

(86) PCT No.: PCT/CN2018/080684
§ 371 (c)(1),
(2) Date: Mar. 15, 2019

(87) PCT Pub. No.: WO2019/183800
PCT Pub. Date: Oct. 3, 2019

(65) Prior Publication Data
US 2021/0260972 A1    Aug. 26, 2021

(51) Int. Cl.
*B60J 3/00* (2006.01)
*B60J 3/02* (2006.01)

(52) U.S. Cl.
CPC ............. *B60J 3/002* (2013.01); *B60J 3/0234* (2013.01)

(58) Field of Classification Search
CPC ...... B60J 3/0239; B60J 3/0265; B60J 3/0208; B60J 3/0204; B60J 3/0278; B60J 3/0282; B60J 7/0015; B60J 3/0213; B60J 3/0252; B60J 7/003
USPC ... 296/97.11, 97.9, 97.8, 85, 37.16, 29, 210, 296/143, 214, 97.12; 701/45, 1, 112, 701/113, 29.2, 301, 36, 41, 46, 49, 51
See application file for complete search history.

(56) References Cited

U.S. PATENT DOCUMENTS

| | | | | |
|---|---|---|---|---|
| 6,206,451 | B1* | 3/2001 | Maano | B60J 11/00 296/136.04 |
| 6,227,601 | B1* | 5/2001 | LaFrance | B60J 1/2011 296/97.11 |
| 8,366,172 | B1* | 2/2013 | Morazan | B60J 11/00 296/97.1 |
| 9,045,021 | B2* | 6/2015 | Sene | B60J 3/002 |
| 2004/0119313 | A1* | 6/2004 | Naik | B60J 3/0204 296/97.2 |
| 2009/0038766 | A1* | 2/2009 | Smith, Jr. | B60J 11/06 160/370.21 |

(Continued)

FOREIGN PATENT DOCUMENTS

| | | |
|---|---|---|
| CN | 2664292 Y | 12/2004 |
| CN | 201729049 U | 2/2011 |
| CN | 107253431 A | 10/2017 |

*Primary Examiner* — D Glenn Dayoan
*Assistant Examiner* — Sunsurraye Westbrook (57) ABSTRACT

Disclosed is a vehicle having a movable and retractable sun shield. The vehicle comprises a vehicle body and a retractable device, wherein a cavity is arranged at the top of the cab of the vehicle body, an opening is arranged on the front end of the cavity; and the retractable device comprises a sun shield and an actuating device, the sun shield is mounted in the cavity at the top of vehicle body in an extensible and retractable manner, the actuating device is mounted in the cavity at the top of vehicle body and coupled to the sun shield to drive the sun shield to stretch out and draw back, the cavity at the top of vehicle body is provided with a sliding rail, the sun shield is provided with bending rims at two sides thereof, and the bending rims are slidably engaged on the sliding rail.

19 Claims, 4 Drawing Sheets

(56) References Cited

U.S. PATENT DOCUMENTS

2019/0001824 A1\* 1/2019 Lu .......................... H02S 10/40
2020/0055380 A1\* 2/2020 Dexter ................... B60J 7/0023

\* cited by examiner

VEHICLE HAVING A MOVABLE AND RETRACTABLE SUN SHIELD

TECHNICAL FIELD

The present disclosure relates to vehicles, and more particularly, to a vehicle having a movable and retractable sun shield.

BACKGROUND

Cars are important means of transportation for people to travel, especially on a rainy and blustery day or in the blazing sun. When the weather is bad, such as heavy rain or burning sun, a car driver's sight is likely to be influenced. Furthermore, the driver is non-immune to the sun's exposure during driving. In this case, the prior art car is usually provided with a sun-shield cloth that can be pulled down inside and a wiper installed outside the front windshield of the vehicle.

The sun-shield cloth inside the car is positioned near the driver's face to mainly preventing the sun from shining on the driver's eyes. However, such configuration limits its uses and is easy to block the line of sight, causing security concerns. In addition, other parts of the driver's body, such as his/her bare arms, are susceptible to sunburn due to exposure to the sun. When driving in rainy weather, rainwater may form a water film on the front windshield, causing blurred vision and light scattering. Consequently, it is impossible to see the road ahead and to carry out safe driving.

A sun shading device installed on the top of an automobile may be used as prior art. Unfortunately, it is complicated in structure and inconvenient to use. More than that, though, the device cannot be completely recovered when not in use, affecting the appearance of the vehicle and increasing the wind resistance.

SUMMARY OF THE INVENTION

To solve the above problems, a vehicle having an easy-to-use movable and retractable sun shield is provided in the present disclosure to offer functions of shading the sun and rain with a safe and beautiful appearance.

In an embodiment, a vehicle having a movable and retractable sun shield may comprise a vehicle body and a retractable device. A cavity is arranged at the top of the cab of the vehicle body, and an opening is arranged on the front end of the cavity. The retractable device may comprise a sun shield and an actuating device. The sun shield is mounted in the cavity at the top of vehicle body in an extensible and retractable manner, the actuating device is mounted in the cavity at the top of vehicle body and coupled to the sun shield to drive the sun shield to stretch out and draw back, the cavity at the top of vehicle body is provided with a sliding rail, the sun shield is provided with bending rims at two sides thereof, and the bending rims are slidably engaged on the sliding rail.

Further, the sliding rail is a rubber sliding rail having a linear groove.

Further, a water-retaining rubber band is arranged at an edge of the opening at the cavity of the vehicle body.

Further, the water-retaining rubber band comprises a clamping portion and a water-retaining portion, the clamping portion has a U-shaped structure in a cross-sectional direction, and the clamping portion is engaged with the edge of the opening of the cavity.

Further, alternatively opposite barbed portions are arranged on two inner side walls of the clamping portion.

Further, the clamping portion is a U-shaped steel wire snap joint.

Further, the water-retaining portion is two or three inclined rubber sheets, and the inclined direction of the rubber sheets is arranged outwardly.

Further, the rubber sheet located at the outermost side is aligned with the clamping portion.

Further, the surface of the rubber sheets is flocked or sprayed with a smooth layer.

Further, the water-retaining portion is a hollow rubber band.

Further, drain holes are arranged at a rear end and both sides of the cavity.

Further, the sun shield is a colored transparent PC board, the front end of the sun shield is a circular arc structure, and an edge of the arc front end is bended downward.

Further, the sun shield is further provided with a reinforcing rib.

Further, the retractable device further comprises a first sliding assembly and a second sliding assembly, wherein there are two first sliding assemblies mounted in a parallel manner on the two sides in the cavity of the vehicle body 1, and the second sliding assembly is mounted in a parallel manner between the two first sliding assemblies; the first sliding assembly includes a first sliding guide and a first sliding member, the second sliding assembly includes a second sliding guide and a second sliding member; the sun shield is detachably mounted on the first sliding member and the second sliding member; and the actuating device is coupled to the second sliding member.

Further, the actuating device comprises a driving motor and a traction member, and the driving motor is coupled to the second sliding member via the traction member.

Further, the driving motor is coupled to a power source and a bidirectional control switch inside the vehicle body, and the bidirectional control switch is used for controlling extension and retraction of the sun shield.

In other embodiments, the retractable device further comprises a solar cell panel, the solar cell panel is detachably mounted on the sun shield, and an output end of the solar cell panel is coupled to a charge and discharge controller.

Further, the retractable device further comprises an engaging assembly, the engaging assembly comprises a clamping member and a driving member, the clamping member and the driving member are mounted on the solar cell panel, and the driving member drives the clamping member to be coupled to the sun shield or to fix with the vehicle body.

Further, the clamping member is a clamping strip rotatably mounted on the solar cell panel, slots are arranged on the sun shield and the top of the cavity of the vehicle body for engagement, and the driving member drives the clamping strip to rotate to connected with the slot of the sun shield or with the slot of the cavity of the vehicle body.

Further, a plurality of the clamping members is symmetrically arranged at the front and rear ends of the solar cell panel, and each of the clamping members is provided with a corresponding slot.

Further, the charge and discharge controller is installed in the vehicle, and the charge and discharge controller is coupled to a battery, an electric appliance, and a charging terminal in the vehicle.

Further, the driving member is coupled to a power source and a bidirectional engaging switch inside the vehicle body, and the bidirectional engaging switch is used to control the engagement of the solar cell panel.

According to the vehicle having a movable and retractable sun shield in the above embodiments, the appearance of the vehicle is beautiful and the massive structure is more compact due to the retractable device integrally installed in the cavity at the top of the front portion of the vehicle body; the sun shield can be stretched out by the actuation of the actuating device to effectively prevent raindrops from falling onto the windshield, avoiding the rain blurring the driver's line of sight and ensuring driving safety; and the sun shield can also effectively prevents sunlight from illuminating the driver, improving driving comfort; the sun shield is simple in structure and convenient in operation; the bending rim of the sun shield can increase its own strength, and since the bending rim is engaged at the sliding rail in the cavity, the sun shield can be effectively prevented from shaking left and right when it is stretched out during the movement of the vehicle, increasing the stability of the sun shield.

Descriptions of Reference Numerals of Drawings: 1—vehicle body, 11—sliding rail, 2—retractable device, 21—sun shield, 211—joint, 212—bending rim, 22—actuating device, 221—driving motor, 222—traction member, 23—first sliding assembly, 231—first sliding guide, 232—first sliding member, 24—second sliding assembly, 241—second sliding guide, 242—second sliding member, 25—solar cell panel, 26—engaging assembly, 261—clamping member, 3—water-retaining rubber band, 31—clamping portion, 32—water-retaining portion, 33—barbed portion.

DETAILED DESCRIPTION OF THE EMBODIMENTS

Hereinafter, exemplary embodiments of the present disclosure will be described in detailed with reference to the accompanying drawings.

First Embodiment

A vehicle having a movable and retractable sun shield is provided in this embodiment. The retractable device is integrally mounted in a cavity on the top of the vehicle cab without affecting the appearance of the automobile.

Figure 1:
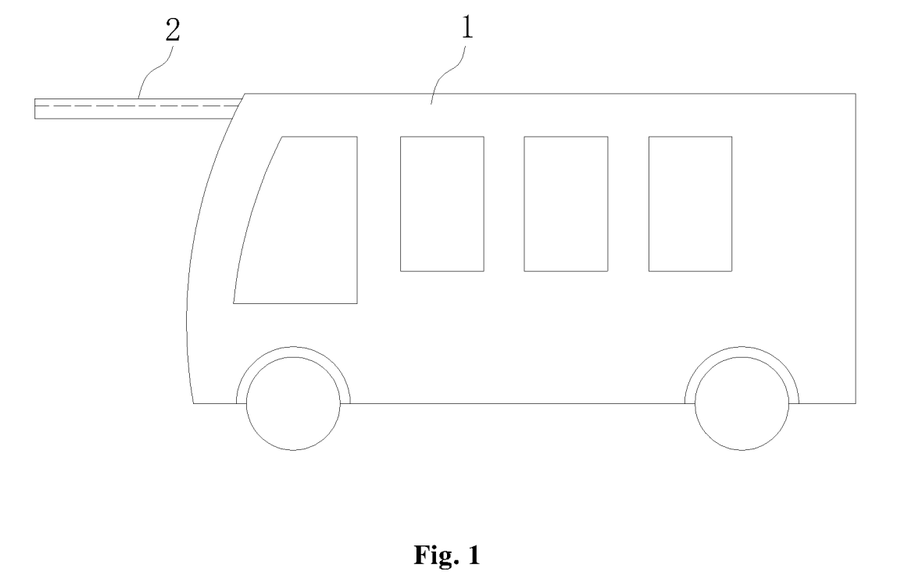
FIG. 1 is a schematic structural view showing a sun shield in an extended state in a first embodiment.

As shown in FIG. 1, the vehicle having the movable and retractable sun shield may mainly comprises a vehicle body 1 and a retractable device 2. The top of the cab of the vehicle body 1 is provided with a cavity. An opening is arranged at the front end of the cavity and faced the front of the vehicle.

Figure 2:
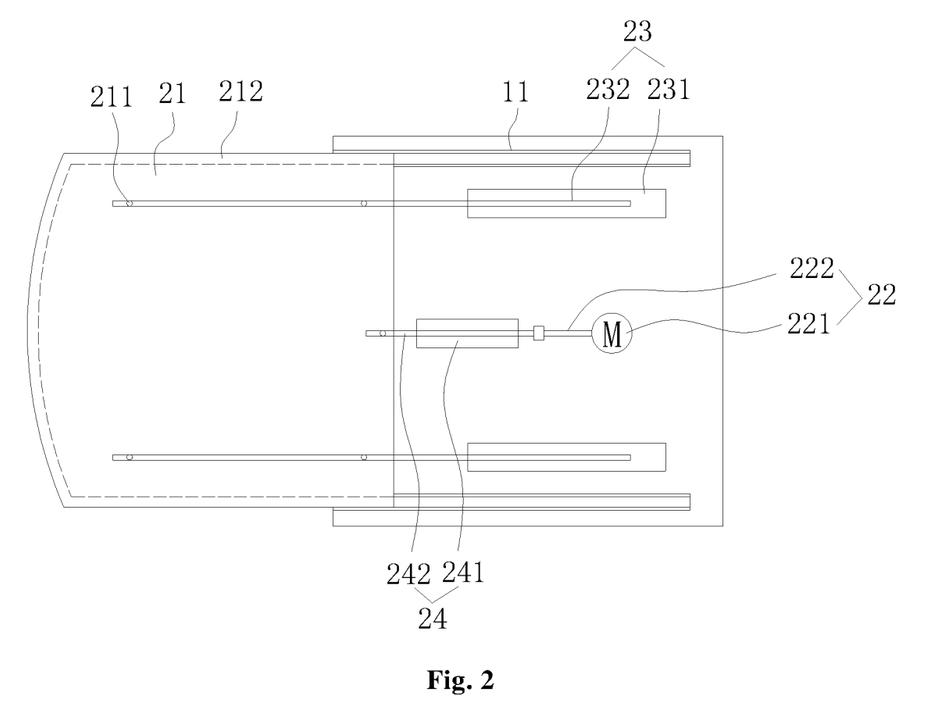
FIG. 2 is a schematic structural view showing a retractable device in the first embodiment.

As shown in FIG. 2, the retractable device 2 mainly includes a sun shield 21 and an actuating device 22. The sun shield 21 and the actuating device 22 are both mounted in the cavity on the top of the vehicle body 1. The sun shield 21 can be mounted in a slidable and retractable configuration. The sun shield 21 and the actuating device 22 are installed on a fixed base which is fixed in the cavity of the vehicle body 1. The actuating device 22 is coupled to the sun shield 21, and the actuating device 22 is configured to drive the sun shield 21 to extend above the front of the vehicle to protect from the rain and the sun and to retract and hide in the cavity of the vehicle body 1. In other embodiments, the fixed base may also be integrated with the vehicle body 1.

In this embodiment, the sun shield 21 is a colored transparent PC board. Due to its characteristics of relatively light weight and high strength, the sun shield can be not only use for preventing from the rain and blocking the sunlight, but also has a certain degree of transparency in the field of vision, which retains the front upper field of view for the driver. Meanwhile, it may be more beautiful by the colored transparent PC board. A Bending rim 212 is arranged on two sides of the sun shield 21, and two sides of the bending rim are bent downward by about 90°. The bending rim 212 increases the strength thereof. Two sliding rails 11 are arranged on both sides inside the cavity of the vehicle body 1. The two sliding rails are rubber sliding rails with linear grooves, so that the two sides of the sun shield 21 can be clamped by the rubber sliding rails during sliding or after being extended, effectively preventing the sun shield 21 from swinging left and right, and improving stability of the sun shield 21. In other embodiments, the sun shield 21 may also be a colored laminated glass.

In this embodiment, the front end of the sun shield 21 is shaped to be a circular arc structure, and the edge of the arc front end is bended downward in a near-vertical orientation. The arrangement of the arc structure itself enhances the structural strength of the sun shield 21, and the vertical edgefold at the front end further increases the strength.

In order to stabilize the shape of the sun shield, reinforcing ribs can be provided in the middle of the sun shield 21. The reinforcing ribs are mainly arranged along the left and right directions of the vehicle. In other embodiments, a plurality of the reinforcing ribs may be provided, or at the same time, the reinforcing ribs may be arranged at the front and rear directions of the vehicle.

In this embodiment, a water-retaining rubber band 3 is arranged at the opening of the top cavity of the vehicle body 1. The water-retaining rubber band 3 can effectively prevent water on the sun shield 21 from entering the interior of the cavity.

Figure 3:
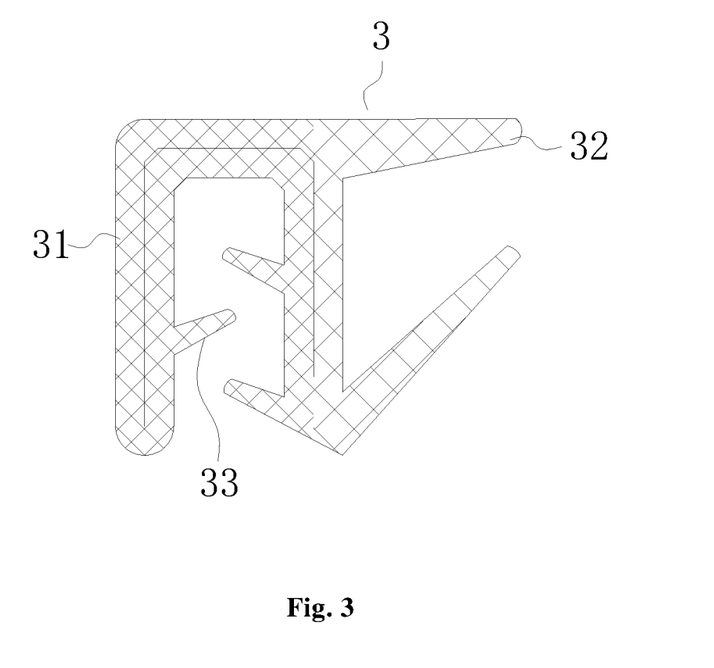
FIG. 3 is a retractable device of a water-retaining rubber band in the first embodiment.

As shown in FIG. 3, the water-retaining rubber band 3 includes a clamping portion 31 and a water-retaining portion 32. The clamping portion 31 has a U-shaped structure in a cross-sectional direction, and the clamping portion 31 in the U-shaped structure is engaged with the edge of the opening at the cavity of the body. The clamping portion 31 is a steel wire snap joint having a strong engaging force. Alternatively opposite barbed portions 33 are arranged on two inner side walls of the U-shaped structural clamping portion 31, and when the clamping portion 31 is engaged, the barbed portion 33 can fixedly lock with the edge of the opening at the cavity, so that the clamping portion 31 can be securely engaged. The water-retaining portion 32 can be elastically extendable and retractable when pressed, and when the water-retaining portion 32 is in contact with the sun shield 21, it can provide a waterproof function.

The ortion 32 may be two or three inclined rubber sheets, and the inclined direction of the rubber sheets is arranged outward (toward the outside of the cavity). The configuration of two inclined rubber sheets may enhance general appearance and waterproof effect. The outermost rubber sheet may be aligned with the clamping portion 31, that is, the rubber sheet is flush with the outer of the clamping portion 31 for a better appearance. The rubber sheets are surrounded by flocking sprayed with a smooth layer to reduce friction and facilitate stretching.

Figure 4:
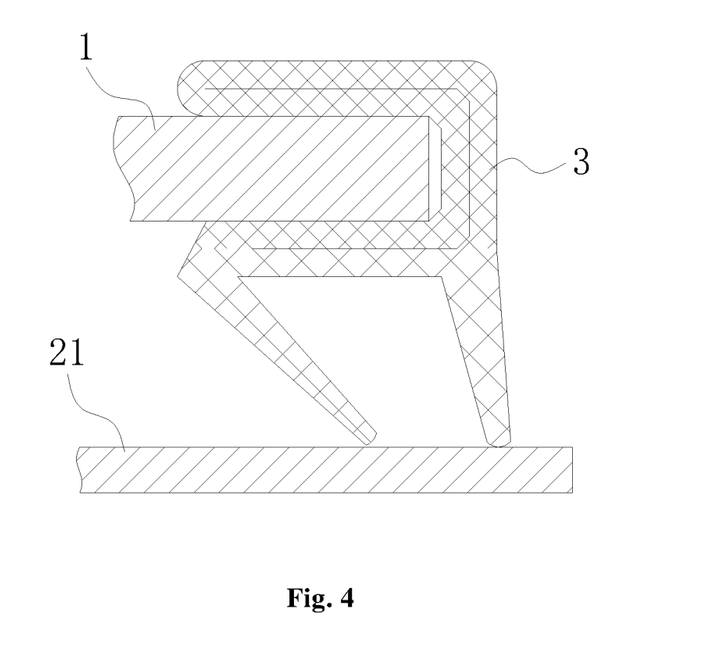
FIG. 4 is schematic view showing an installation structure of the water-retaining rubber band in the first embodiment.

Referring to FIG. 4, it shows the installation and usage of the water-retaining rubber band 3. The water-retaining portion 32 can block the rainwater to reduce rainwater from entering the cavity.

Although the water-retaining rubber band is provided on the opening at the cavity of the vehicle body 1, the rainwater still more or less accumulates in the cavity. In this embodiment, in order to discharge the water in the cavity, a plurality of drainage holes are arranged on both sides and the rear end of the cavity (towards the direction of the rear of the vehicle), through which the wind entering the cavity may drain away the accumulated water as the vehicle moves on to ensure the safety of all parts in the cavity.

In this embodiment, in order to make the sun shield 21 stretch out and draw back more smoothly and stably, the retractable device 2 may further include a first sliding assembly 23 and a second sliding assembly 24. There may be two first sliding assemblies 23 mounted in a parallel manner on both sides in the cavity at the top of the front portion of the vehicle body 1, and two second sliding assemblies 24 mounted in a parallel manner between the two first sliding assemblies 23. The first sliding assembly 23 may include a first sliding guide 231 and a first sliding member 232, and the second sliding assembly 24 may include a second sliding guide 241 and a second sliding member 242. The sun shield 21 may be detachably mounted on the first sliding member 232 and the second sliding member 242. For example, the sun shield 21 is detachably mounted at the joint 211 by bolts or buckles, so that the sun shield with different colors and patterns can be replaced, which beautifies the appearance and shows stylish personality and also be easy to replace a broken sun shield 21.

The actuating device 22 may include a driving motor 221 and a traction member 222. The driving motor 221 may be coupled to the second sliding member 242 through the traction member 222. The actuating device 22 may drive the second sliding member 242 through the traction member 222 to slide along the second sliding guide 241, thereby driving the sun shield 21 to slide.

In this embodiment, the driving motor 221 may be further coupled to a power supply inside the vehicle body 1 via a bidirectional control switch. A driver of the vehicle can directly control the negative and the positive rotation of the driving motor 221 to directly extend and retract the sun shield 21 through the bidirectional control switch. The bidirectional control switch may also be used to control the extension length of the sun shield 21 according to different vehicle sizes, various vehicle speeds, and vehicle conditions to achieve a better driving experience.

With the vehicle having the movable and retractable sun shield provided in this embodiment, there can be a plurality of outstanding features. For example, the appearance of the vehicle is beautiful and the massive structure is more compact due to the retractable device 2 integrally installed in the cavity at the top of the front portion of the vehicle body 1. For another example, the sun shield 21 can be stretched out by the actuation of the actuating device 22 to effectively prevent raindrops from falling onto the windshield, avoiding the rain blurring the driver's line of sight and ensuring driving safety; and the sun shield 21 can also effectively prevents sunlight from illuminating the driver, improving driving comfort. For still another example, the sun shield is simple in structure and convenient in operation. Moreover, the bending rim 212 of the sun shield can increase its own strength, and since the bending rim 212 is engaged at the sliding rail in the cavity, the sun shield can be effectively prevented from shaking left and right when it is stretched out during the movement of the vehicle, increasing the stability of the sun shield.

Second Embodiment

The embodiment provides another vehicle having a moveable and retractable sun shield. Compared with the vehicle in the first embodiment, there is solar cell panel and related components added in the vehicle in this embodiment, so that electrical energy can be obtained by the solar cell panel while the sun shield is stretched out for sunshade, achieving obvious energy saving effect. In addition, the solar cell panel can be detachable, and the entire solar cell panel can be detachable when not needed and be installed when in use, making it easier to maintain.

Figure 5:
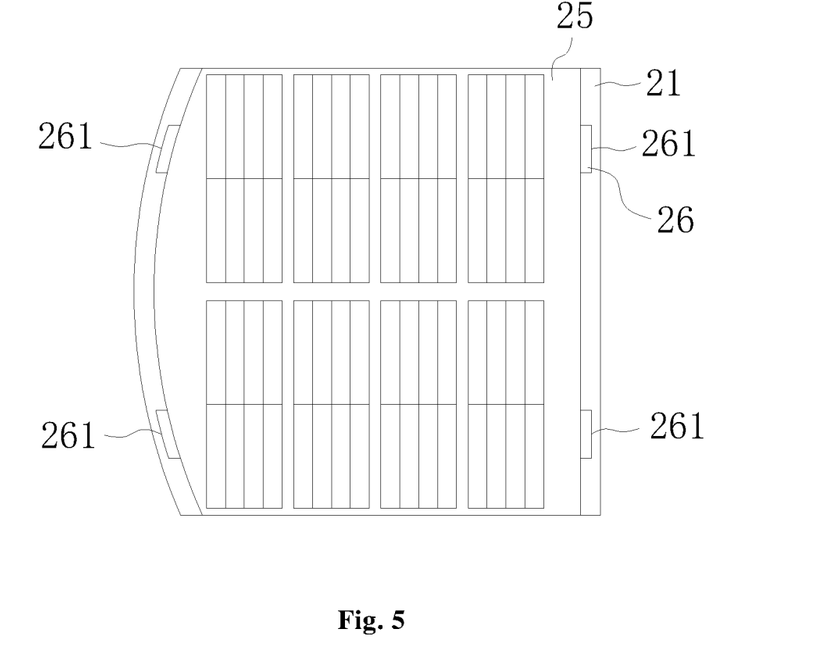
FIG. 5 is a schematic plan view showing an installation structure of a solar cell panel in a second embodiment.
Figure 6:
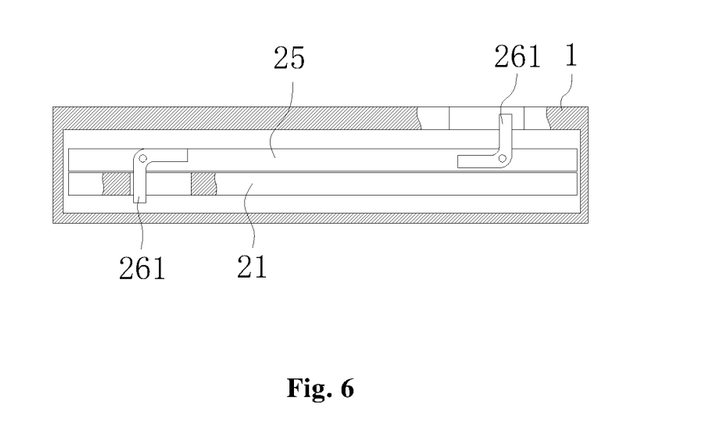
FIG. 6 is a schematic side view showing the installation structure of the solar cell panel in the second embodiment.

As shown in FIG. 5 and FIG. 6, in the vehicle having a moveable and retractable sun shield provided in this embodiment, the retractable device 2 may further include a solar cell panel 25 and an engaging assembly 26. The size of the solar cell panel 25 is substantially the same as that of the sun shield 21, and the movable direction (i.e. the front-rear direction) is slightly shorter than that of the sun shield 21. The solar cell panel 25 is stacked on the top of the sun shield 21. The solar cell panel 25 can be engaged with the sun shield 21 through the engaging assembly 26, or can be locked in the cavity at the top of the vehicle body 1 through the engaging assembly assembly 26. The solar cell panel 25 and the sun shield 21 are engaged together and may be stretched out when the sun shield 21 is extended for sunshade on a sunny day, meanwhile the solar cell panel 25 is used for power generation. In a rainy day, the sun shield 21 is extended for rain shielding and the solar cell panel 25 is locked in the cavity on the top of the vehicle body 1 to avoid rain.

Specifically, the engaging assembly 26 may include a clamping member 261 and a driving member (not shown). The clamping member 261 may be a bent clamping strip which may be rotatably mounted on the front and rear ends of the solar cell panel 25. The driving member may be fixed on the solar cell panel 25, and a driving end of the driving member may be coupled to the clamping strip to rotate the clamping strip. The driving member can be a driving mechanism such as a mini motor or a cylinder connecting rod mechanism. Correspondingly, slots are arranged on both ends of the sun shield 21 and on the top of the cavity. The driving member can used to drive the clamping member 261 to engage in the slot at the sun shield 21 or engage in the slot at the top of the top of the cavity.

In order to achieve a stable engagement of the solar cell panel 25, there may be four engaging assemblies respectively symmetrically arranged at the front and rear ends of the solar cell panel 25, i.e. two spaced engaging assemblies 26 are provided at the front and rear ends respectively, thereby four clamping members 261 are capable of firmly engaging the solar cell panel 25 on the sun shield 21.

In other embodiments, the clamping member 261 may be a metal straight rod, and the driving member may be a combination of an electromagnetic suction head and a spring. The extension and retraction of the metal straight rod may be realized by the adsorption action of the electromagnetic suction head and the thrust of the spring. The clamping member 261 may be engaged in an extending and retracting manner in the slot at the sun shield 21 or the slot at the top of the cavity. Or, the clamping member 261 and the driving member may be mounted on the sun shield 21 and the top of the cavity respectively, and corresponding slots are provided on the solar cell panel 25, also achieving the engagement of the solar cell panel 25.

Figure 7:
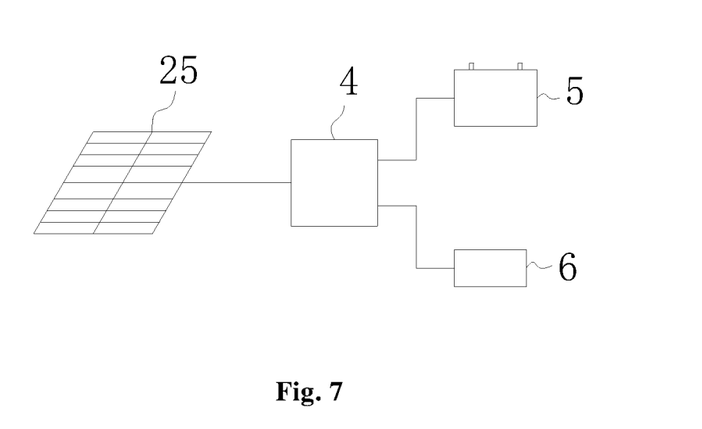
FIG. 7 is a schematic diagram of circuit connection of the solar cell panel in the second embodiment.

In this embodiment, as shown in FIG. 7, an output end of the solar cell panel 25 is coupled to related components, which may include a, a battery 5, an electric appliance 6, and the like. Direct current generated by the solar cell panel 25 may be distributed to the battery 5 for storage via the charge and discharge controller 4 in the vehicle or to the electric appliance 6 for direct use.

As to the vehicle having the movable and retractable sun shield provided by this embodiment, the solar cell panel 25 is mounted on the sun shield 21, and the solar cell panel 25 can be respectively engaged with the sun shield 21 and the vehicle body 1, so that the solar cell panel 25 can be stretched out together with the sun shield 21 for sunshade and electricity generation or be hidden in the cavity of the vehicle body 1 to avoid rain. Accordingly, in a long-term use, the vehicle may not only save a lot of electric energy, but also has a long service life.

The principle and implementation manners of the present disclosure has been described above with reference to specific embodiments, which are merely provided for the purpose of understanding the present disclosure and are not intended to limit the present disclosure. It will be possible for those skilled in the art to make variations based on the principle of the present disclosure.

The invention claimed is:

1. A vehicle having a movable and retractable sun shield, comprising a vehicle body and a retractable device, wherein a cavity is arranged at the top of the cab of the vehicle body, an opening is arranged on the front end of the cavity; and the retractable device comprises a sun shield and an actuating device, the sun shield is mounted in the cavity at the top of vehicle body in an extensible and retractable manner, the actuating device is mounted in the cavity at the top of vehicle body and coupled to the sun shield to drive the sun shield to stretch out and draw back, the cavity at the top of vehicle body is provided with a sliding rail, the sun shield is provided with bending rims at two sides thereof, and the bending rims are slidably engaged on the sliding rail, wherein the retractable device further comprises a solar cell panel, the solar cell panel is detachably mounted on the sun shield, and an output end of the solar cell panel is coupled to a charge and discharge controller, wherein the retractable device further comprises an engaging assembly, the engaging assembly comprises a clamping member and a driving member, the clamping member and the driving member are mounted on the solar cell panel, and the clamping member is driven by the driving member to be coupled to the sun shield or to fix with the vehicle body, wherein the clamping member is a clamping strip rotatably mounted on the solar cell panel, slots are arranged on the sun shield and the top of the cavity of the vehicle body for engagement, and the driving member drives the clamping strip to rotate to connected with the slot of the sun shield or with the slot of the cavity of the vehicle body.

2. The vehicle having a movable and retractable sun shield according to claim 1, wherein the sliding rail is a rubber sliding rail having a linear groove.

3. The vehicle having a movable and retractable sun shield according to claim 1, wherein a water-retaining rubber band is arranged at an edge of the opening at the cavity of the vehicle body.

4. The vehicle having a movable and retractable sun shield according to claim 3, wherein the water-retaining rubber band comprises a clamping portion and a water-retaining portion, the clamping portion has a U-shaped structure in a cross-sectional direction, and the clamping portion is engaged with the edge of the opening of the cavity.

5. The vehicle having a movable and retractable sun shield according to claim 4, wherein alternatively opposite barbed portions are arranged on two inner side walls of the clamping portion.

6. The vehicle having a movable and retractable sun shield according to claim 4, wherein the clamping portion is a U-shaped steel wire snap joint.

7. The vehicle having a movable and retractable sun shield according to claim 4, wherein the water-retaining portion is two or three inclined rubber sheets, and the inclined direction of the rubber sheets is arranged outwardly.

8. The vehicle having a movable and retractable sun shield according to claim 7, wherein the rubber sheet located at the outermost side is aligned with the clamping portion.

9. The vehicle having a movable and retractable sun shield according to claim 7, wherein the surface of the rubber sheets is flocked or sprayed with a smooth layer.

10. The vehicle having a movable and retractable sun shield according to claim 3, wherein the water-retaining portion is a hollow rubber band.

11. The vehicle having a movable and retractable sun shield according to claim 1, wherein drain holes are arranged at a rear end and both sides of the cavity.

12. The vehicle having a movable and retractable sun shield according to claim 1, wherein the sun shield is a colored transparent PC board, the front end of the sun shield is a circular arc structure, and an edge of the arc front end is bended downward.

13. The vehicle having a movable and retractable sun shield according to claim 1, wherein the sun shield is further provided with a reinforcing rib.

14. The vehicle having a movable and retractable sun shield according to claim 1, wherein the retractable device further comprises a first sliding assembly and a second sliding assembly, wherein there are two first sliding assemblies mounted in a parallel manner on the two sides in the cavity of the vehicle body 1, and the second sliding assembly is mounted in a parallel manner between the two first sliding assemblies; the first sliding assembly includes a first sliding guide and a first sliding member, the second sliding assembly includes a second sliding guide and a second sliding member; the sun shield is detachably mounted on the first sliding member and the second sliding member; and the actuating device is coupled to the second sliding member.

15. The vehicle having a movable and retractable sun shield according to claim 12, wherein the actuating device comprises a driving motor and a traction member, and the driving motor is coupled to the second sliding member via the traction member.

16. The vehicle having a movable and retractable sun shield according to claim 13, wherein the driving motor is coupled to a power source and a bidirectional control switch inside the vehicle body, and the bidirectional control switch is used for controlling extension and retraction of the sun shield.

17. The vehicle having a movable and retractable sun shield according to claim 1, wherein a plurality of the clamping members is symmetrically arranged at the front and rear ends of the solar cell panel, and each of the clamping members is provided with a corresponding slot.

18. The vehicle having a movable and retractable sun shield according to claim 1, wherein the charge and discharge controller is installed in the vehicle, and the charge and discharge controller is coupled to a battery, an electric appliance, and a charging terminal in the vehicle.

19. The vehicle having a movable and retractable sun shield according to claim 1, wherein the driving member is coupled to a power source and a bidirectional engaging switch inside the vehicle body, and the bidirectional engaging switch is used to control the engagement of the solar cell panel.

\* \* \* \* \*